Oct. 12, 1926.
J. C. BONNELL
MAP GAME
Filed Jan. 20, 1925   2 Sheets-Sheet 1
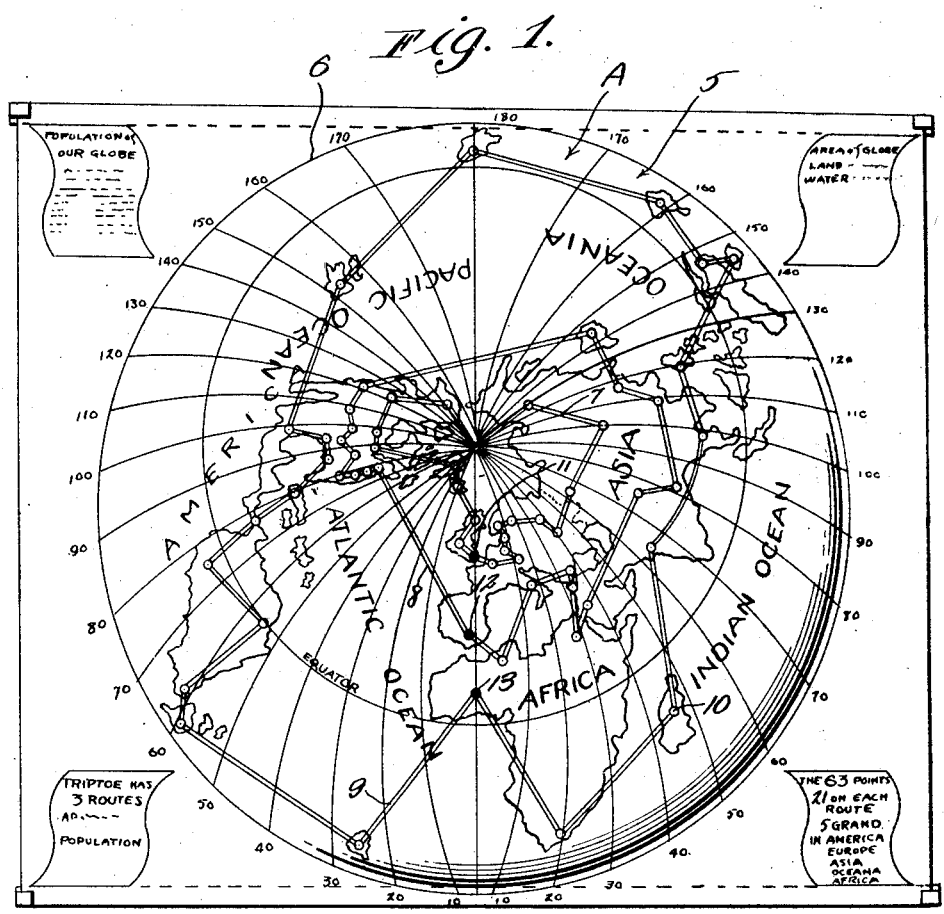
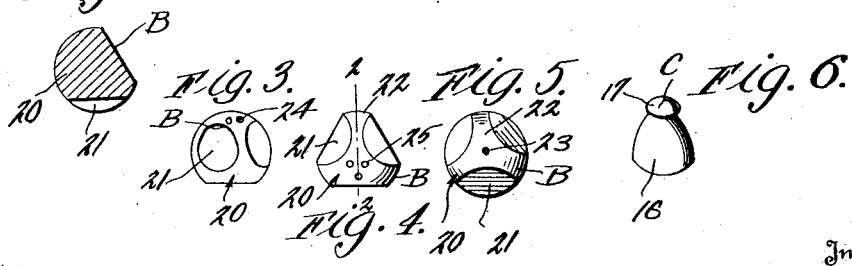
Witnesses:
Inventor
JOHN C. BONNELL.
By Richard B. Owen
Attorney Oct. 12, 1926.  
J. C. BONNELL  
MAP GAME  
Filed Jan. 20, 1925   2 Sheets-Sheet 2
1,602,841
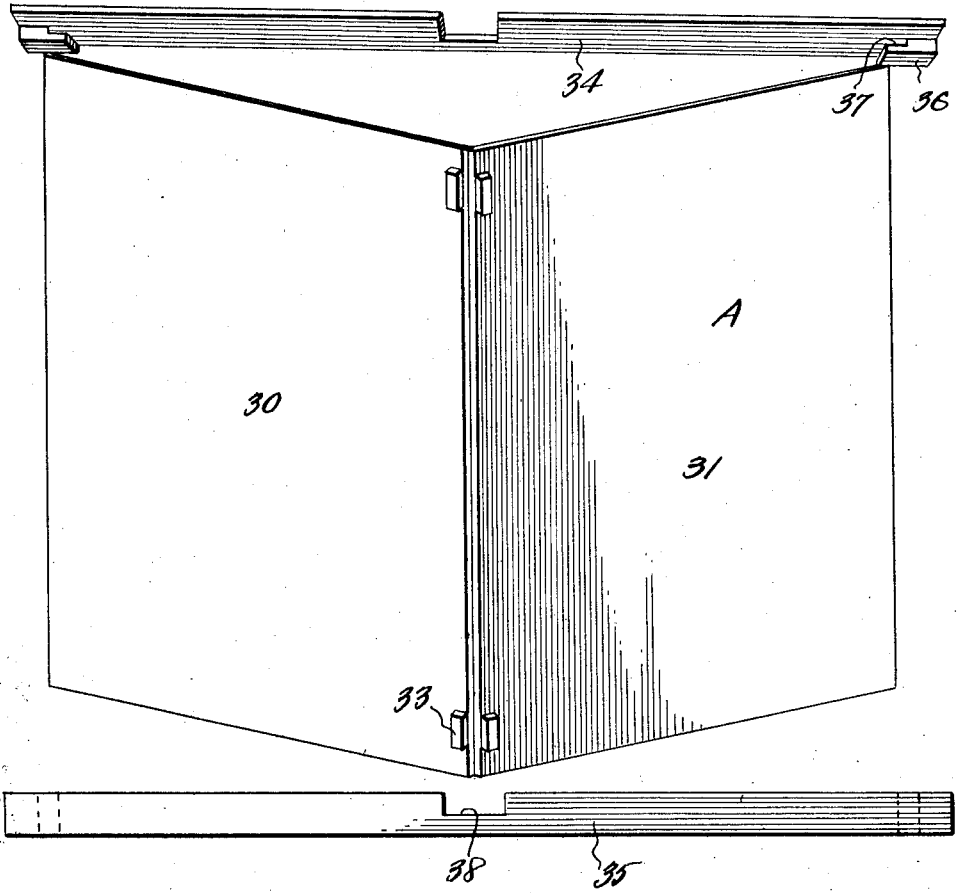
FIG. 7.
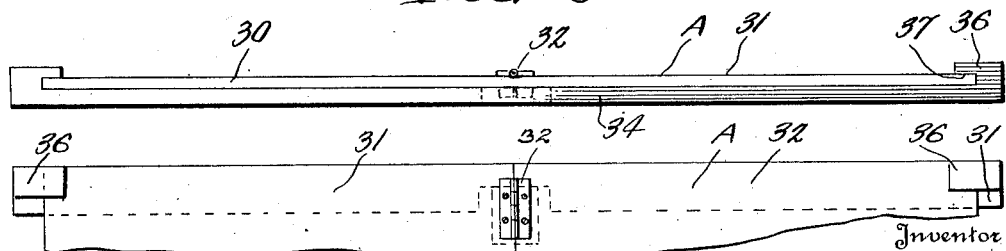
FIG. 8.
FIG. 9.
WITNESS:
Inventor
JOHN C. BONNELL
By Richard B. Owen.
Attorney Patented Oct. 12, 1926.

1,602,841

UNITED STATES PATENT OFFICE.

JOHN C. BONNELL, OF LEAGUE CITY, TEXAS.

MAP GAME.

Application filed January 20, 1925. Serial No. 3,685.

This invention appertains to novel educational game apparatus and the primary object of this invention is to provide a novel game which will be both amusing and educational and which can be played by a number of different persons simultaneously.

Another object of the invention is to provide an educational game apparatus embodying a novel map showing substantially the entire world encircled by a number of independent routes, each route embodying the same number of stops, and novel pieces for travelling the routes, the pieces being controlled by novel chance members for indicating the number of stops each piece is to be moved upon the operation of said chance members.

A still further object of the invention is to provide an improved chance controlled educational game of the above character which will be attractive in appearance and which will be amusing both to old and young.

With these and other objects in view, the invention consists in the novel construction, arrangement and formation of parts, as will be hereinafter more specifically described, claimed, and illustrated in the accompanying drawings, in which drawings, Figure 1 is a plan view showing the improved game board in its opened position, Figure 2 is sectional view through one of the chance members.

Figure 3 is a side elevation of the same,

Figure 4 is an elevation of one of the chance members looking at a different angle from Figure 3, Figure 5 is a top plan view of one of the chance members, Figure 6 is a detail perspective view of one of the game pieces or men, Figure 7 is a perspective view showing the game board in its partially opened position and the novel stretcher bars for the board, Figure 8 is an edge elevation of the game board showing one of the stretcher bars in its operative position on the board, Figure 9 is a fragmentary plan view of the board showing one of the stretcher bars in position thereon.

Referring to the drawings in detail, wherein similar reference characters designate corresponding parts throughout the several views the letter A generally indicates the improved game board, B one of the chance members and C one of the men used on the board.

The improved game board A comprises a map 5 of the world with the various continents arranged around a central point and enclosed within a circular line 6 to represent a globe. The map 5 is suitably colored and marked so as to make the same closely resemble a globe.

In accordance with the game the map 5 has drawn about the same three different routes 7, 8 and 9 and the upper route 7 is called the northern route, while the route 8 is called the mid route and the route 9 the southern route. These routes touch at different important points on the world as indicated by the reference character 10 and each of these points will be hereinafter referred to as stops. Each route 7, 8 and 9 embodies twenty-one stops and these stops are clearly lettered to indicate the name of the place and three of the stops of the three routes are arranged in substantial transverse alignment on the board and are the home stops and are indicated by the reference characters 11, 12 and 13 respectively. The upper route 7 has its home stop 11 at London, England, and the mid route 8 has its home stop 12 at Madrid, Spain, while the southern route 9 has its home stop 13 at Timbuktu, Africa.

Each route is adapted to be travelled by a game piece or man 15 and the object of the game is to see which man can circle the globe first in accordance with the rules of the game which will be hereinafter given. Each game piece or man 15 is of a distinctive color, so that the men can be readily told from one another. While the man 15 can assume any configuration, it is preferred that each embody a conical body portion 16 and a concavo-convex shaped head 17.

In order to control the movement of the game pieces or men around the different routes a chance controlled member B as heretobefore stated is provided for each man or game piece C.

These chance members B are similar to the ordinary dice and are manipulated in the same way and each member B embodies a solid body 20 having four flat faces 21 and an apex portion 22 directly opposite each flat face. Each apex portion is distinctly marked such as by the mark "zero," and groups of dots 23, 24 and 25. In one group that is a single dot and the next group there are two dots and in the third group there are three dots.

The chance members B are colored in accordance with the color of the game pieces or men C.

In playing the game, the players choose the desired game piece and the player taking the northern route rolls the three chance members out on the board, and each player moves his man according to the markings on his chance member. Thus if the chance member which is colored the same as the man or game piece for the northern route has one dot uppermost the player takes his piece and moves it on his home stop. If the chance member which is colored the same as the man for the mid route has its markings with two or three dots uppermost, the man is moved two or three stops accordingly. If the chance member which is colored the same as the man for the southern route has the marking zero uppermost, the man cannot be placed upon the game board and this player has to wait until the chance members are again rolled.

The player travelling the mid route then takes the chance members and again rolls the same on the board and the players again move their pieces according to the markings on the members. After the game pieces have been moved the player using the southern route rolls the members and the game pieces are again moved. This procedure is again followed out until one of the pieces encircles the globe and arrives home at which time he wins the game. In order to make the game more attractive and difficult other rules can be employed in the game such as when the pieces are travelling and one of the chance members turns up the marking zero, the corresponding piece will have to move backward one stop instead of moving forwardly. When a piece is nearing its home stop, say one stop away, it is necessary for his chance member to stop with the one dot uppermost before he can move home.

I prefer to secure the map 5 on back plates 30 and 31 and these plates can be hingedly connected together as at 32 in order to permit the folding thereof. In order to prevent the breaking of the hinges 32 the back of the plates 30 and 31 can be provided with stop blocks 33 which are adapted to abut one another when the back plates are opened to their full flat position.

In order to hold the back boards 30 and 31 in their fully opened position against closing movement stretcher bars 34 and 35 are provided. These bars are adapted to extend longitudinally of the game apparatus and the terminals thereof are provided with lugs 36 having notches 37 formed therein for receiving the edges of the game board.

These stretcher boards also form rests for engaging the table or other support upon which the game board is laid. The intermediate portions of the stretcher boards 34 and 35 have one of their longitudinal edges provided with notches 38 for receiving the stop block 33 and the blocks fitted within the notches 38 also prevent closing movement of the board.

Changes as to details may be made without departing from the spirit or the scope of this invention, but:—

What I claim as new is:—

A game apparatus comprising a flat map of the world marked to simulate the appearance of a globe, the map being encircled by marking indicating a northern route of travel, a mid route of travel and a southern route of travel, each of the routes including an equal number of stops, the stops of each route touching different cities on the globe, one stop in each route constituting a home base, a man for each route distinctly colored for movement from one stop to the other, and a chance controlled member for each man colored to correspond to the color of the man for indicating the movement of the man over its route of travel.

In testimony whereof I affix my signature.

JOHN C. BONNELL.